United States Patent
Praharaj et al.

(10) Patent No.: US 10,467,773 B2
(45) Date of Patent: Nov. 5, 2019

(54) IN-LINE FAILURE DETECTION OF A CURING LIGHT SOURCE OF A THREE DIMENSIONAL OBJECT PRINTER

(71) Applicant: Xerox Corporation, Norwalk, CT (US)

(72) Inventors: Seemit Praharaj, Webster, NY (US); Michael Jon Levy, Webster, NY (US); Jason Matthew LeFevre, Penfield, NY (US); Paul McConville, Webster, NY (US); Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 315 days.

(21) Appl. No.: 15/473,019

(22) Filed: Mar. 29, 2017

(65) Prior Publication Data
US 2018/0281308 A1  Oct. 4, 2018

(51) Int. Cl.
| | |
|---|---|
| *G06T 7/90* | (2017.01) |
| *B33Y 10/00* | (2015.01) |
| *B33Y 50/00* | (2015.01) |
| *B33Y 50/02* | (2015.01) |
| *B29C 35/08* | (2006.01) |
| *G01J 3/46* | (2006.01) |
| *B29C 64/264* | (2017.01) |
| *B29C 64/112* | (2017.01) |
| *B29C 64/386* | (2017.01) |
| *B33Y 30/00* | (2015.01) |
| *B29C 37/00* | (2006.01) |

(Continued)

(52) U.S. Cl.
CPC .......... *G06T 7/90* (2017.01); *B29C 35/0805* (2013.01); *B29C 64/112* (2017.08); *B29C 64/264* (2017.08); *B29C 64/386* (2017.08); *B33Y 10/00* (2014.12); *B33Y 50/02* (2014.12); *G01J 3/46* (2013.01); *B29C 64/30* (2017.08); *B29C 64/393* (2017.08); *B29C 2035/0827* (2013.01); *B29C 2037/90* (2013.01); *B33Y 30/00* (2014.12); *G06T 2207/10024* (2013.01)

(58) Field of Classification Search
CPC .......... G06T 7/90; B33Y 10/00; B33Y 50/02; B29C 64/264; B29C 64/112; B29C 64/386; B29C 35/0805
See application file for complete search history.

(56) References Cited

U.S. PATENT DOCUMENTS

| | | |
|---|---|---|
| 7,300,129 B2 | 11/2007 | Kumamoto et al. |
| 7,766,473 B2 | 8/2010 | Hoshino |
| 2003/0151656 A1 | 8/2003 | Kokubo et al. |

(Continued)

*Primary Examiner* — Michael P Wieczorek

(57) ABSTRACT

A print system and a method for detecting inline failure of a curing light source of a 3D object printer are disclosed. For example, the print system includes a plurality of printheads, a curing light source, an inline failure detection (IFD) system, a movable member to hold an object, a heat resistant member coupled to the movable member that holds a thermal paper for testing operation of the curing light source and a controller to control movement of the movable member to move the object past the array of printheads, to operate the plurality of printheads to eject the marking material onto the object as the object passes the two-dimensional array of printheads, to operate the curing light source to apply energy to the thermal paper and to cure the marking material, and to operate the IFD system to read the thermal paper to detect a failure of the curing light source.

10 Claims, 6 Drawing Sheets

(51) Int. Cl.
*B29C 64/30* (2017.01)
*B29C 64/393* (2017.01)

(56) References Cited

U.S. PATENT DOCUMENTS

| | | |
|---|---|---|
| 2009/0207203 A1 | 8/2009 | Yamamoto |
| 2010/0328083 A1* | 12/2010 | Dillon ............... B05D 3/067 |
| | | 340/600 |
| 2013/0044172 A1 | 2/2013 | Nakajima |
| 2014/0002557 A1 | 1/2014 | Condello et al. |
| 2015/0231897 A1 | 8/2015 | Noell |

* cited by examiner

IN-LINE FAILURE DETECTION OF A CURING LIGHT SOURCE OF A THREE DIMENSIONAL OBJECT PRINTER

The present disclosure relates generally to curing systems and, more particularly, to an apparatus and method for inline failure detection of a curing light source in a three dimensional (3D) object printer.

BACKGROUND

Some printers use UV curable inks to print on articles and objects. UV curable inks are applied onto the article or object and a UV light source is used to cure the ink. The UV light source may be used to initiate a photochemical reaction that generates a crosslinked network of polymers. In other words, the ink is not simply "dried" where solvent is evaporated from the ink. Rather, the UV ink is cured such that the polymers in the UV ink undergo a chemical reaction to link or bond to the article or object.

A curing light source may be used to apply light to cure the UV curable ink. However, if the curing light source malfunctions or does not emit the proper amount of light, the UV curable ink may not completely cure. Uncured UV inks may emit some volatile organic compounds (VOCs). VOCs are considered to have a negative impact on the environment and the end user. Furthermore, if the UV ink is not completely cured, the UV ink that is printed onto the article or object may be wiped off.

SUMMARY

According to aspects illustrated herein, there are provided a print system and a method for detecting inline failure of a curing light source of a 3D object printer. One disclosed feature of the embodiments is a print system that comprises a plurality of printheads arranged in a two-dimensional array, wherein each one of the plurality of printheads is configured to eject a marking material, a curing light source coupled to the two-dimensional array of the plurality of printheads, an inline failure detection (IFD) system coupled to the curing light source, a movable member to hold an object, wherein the movable member is positioned parallel to a plane formed by the two-dimensional array of the plurality of printheads, the curing light source and the IFD system, a heat resistant member coupled to the movable member, wherein the heat resistant member holds a thermal paper for testing operation of the curing light source and a controller to control movement of the movable member to move the object past the array of printheads, to operate the plurality of printheads to eject the marking material onto the object as the object passes the two-dimensional array of printheads, to operate the curing light source to apply energy to the thermal paper and to cure the marking material, and to operate the IFD system to read the thermal paper to detect a failure of the curing light source.

Another disclosed feature of the embodiments is a method for detecting inline failure of a curing light source of a 3D object printer. In one embodiment, the method comprises moving a heat resistant member holding a thermal paper vertically parallel to a plane in front of a curing light source after a two-dimensional array of a plurality of printheads has ejected marking material onto an object, applying energy to the thermal paper, moving the heat resistant member vertically parallel to the plane in front of an inline failure detection (IFD) system and detecting failure of the curing light source based on a reading of the thermal paper.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for inline failure detection of a curing light source in a 3D object printer. As discussed above, some printers use UV curable inks to print on articles and objects. UV curable inks are applied onto the article or object and a UV light source is used to cure the ink. The UV light source may be used to initiate a photochemical reaction that generates a crosslinked network of polymers. In other words, the ink is not simply "dried" where solvent is evaporated from the ink. Rather, the UV ink is cured such that the polymers in the UV ink undergo a chemical reaction to link or bond to the article or object.

A curing light source may be used to applying light to cure the UV curable ink. However, if curing light source malfunctions or does not emit the proper amount of light, the UV curable ink may not completely cure. Uncured UV inks may emit some volatile organic compounds (VOCs). VOCs are considered to have a negative impact on the environment and the end user. Furthermore, if the UV ink is not completely cured, the UV ink that is printed onto the article or object may be wiped off.

Embodiments of the present disclosure provide a novel apparatus and method that provides inline failure detection of a curing light source. The embodiments of the present disclosure provide a relatively inexpensive and efficient solution for providing inline failure detection of the curing light source in a 3D object printer. Furthermore, the embodiments of the present disclosure may be used to detect which light emitting diodes (LEDs) within the curing light source have failed, or are not emitting enough light, such that the LEDs may be corrected.

Figure 1:
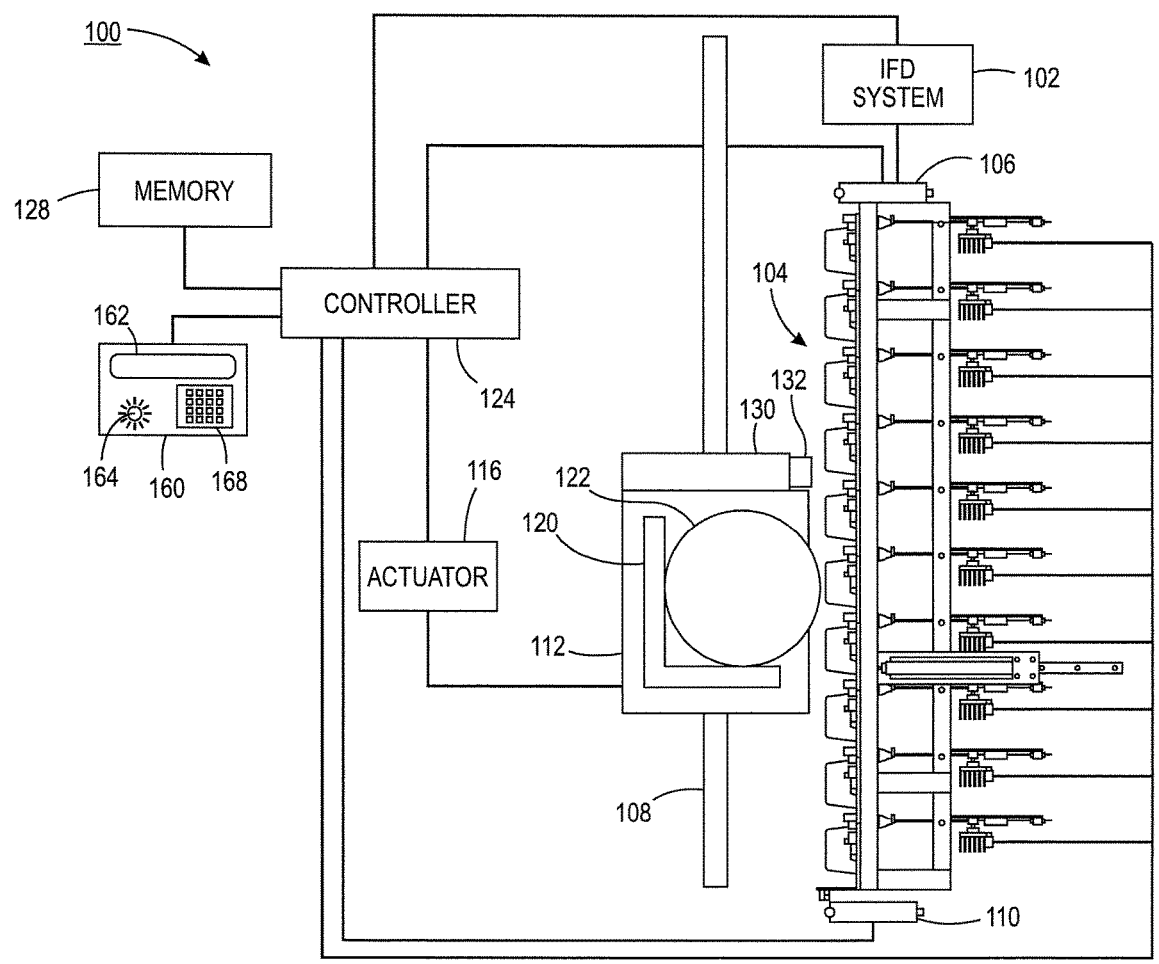
FIG. 1 illustrates an example 3D object printer of the present disclosure.

FIG. 1 illustrates an exemplary printing system 100 configured to print on an object 122. The object 122 may be a three dimensional (3D) object that has an irregular shape. For example, the object 122 may have one or more different curved surfaces with different amounts of curvature. Said another way, the object 122 may not have a flat surface.

In one embodiment, the printing system 100 includes an array, or a plurality, of printheads 104, a support member 108, a member 112 movably mounted to the support member 108, an actuator 116 operatively connected to the movably mounted member 112, an object holder 120 configured to mount to the movably mounted member 112, a heat resistant member 130 to hold a thermal paper 132 and a controller 124 operatively connected to the plurality of printheads and the actuator. As shown in FIG. 1, the array of printheads 104 is arranged in a two-dimensional array, which in the figure is a 10×1 array, although other array configurations can be used. Each printhead is fluidly connected to a supply of marking material (not shown) and is configured to eject marking material received from the supply. Some of the printheads can be connected to the same supply or each printhead can be connected to its own supply so each printhead can eject a different marking material.

In one embodiment, the marking material may be an ultra violet (UV) ink. The marking material may be cured by a curing light source 106. The curing light source 106 may be positioned to cure the marking material after the marking material is ejected by the array of printheads 104. For example, the curing light source 106 may be positioned vertically above or below the array of printheads 104 depending on which direction printing occurs along the support member 108. Said another way, the curing light source 106 may be stacked above or below the array of printheads 104 along a plane formed by the array of printheads 104.

In one embodiment, the controller 124 may also be operatively coupled to the curing light source 106 to control an amount and a duration of light applied to the marking material for curing. In other words, the curing light source 106 may be used to initiate a photochemical reaction that generates a crosslinked network of polymers. In other words, the ink is not simply "dried" where solvent is evaporated from the ink. Rather, the marking material (e.g., the UV ink) is cured such that the polymers in the marking material undergo a chemical reaction to link or bond to the object 122.

In one embodiment, the curing light source 106 may be a two dimensional array of light emitting diodes (LEDs). The LEDs may be UV emitting LEDs that can cure the marking material. Each one of the LEDs may be independently addressable. In other words, the luminosity or light intensity of each LED within the two dimensional array of LEDs may be controlled independent of the other LEDs.

In one embodiment, the controller 124 may also control the actuator 116 to move the heat resistant member 130 that is holding the thermal paper 132 and coupled to the member 112 in front of the curing light source 106. In one embodiment, the thermal paper may be a fine paper that is coated with a chemical that may change color when exposed to heat. The chemical may be a solid-state mixture of a dye and a suitable matrix.

In one embodiment, the thermal paper 132 may transitions to different colors based upon an amount of energy or temperature that the thermal paper 132 is exposed to. In other words, different light intensities that are applied by the curing light source 106 may be associated with different temperatures. When the thermal paper 132 is exposed to a particular temperature, the thermal paper 132 may change color to the color associated with the particular temperature.

In one embodiment, changing color may be changing to darker shades as temperature increases (e.g., from white to completely black).

In one embodiment, the heat resistant member 130 may be any type of material that maintains a constant temperature, or maintains a temperature within a predefined temperature range, when exposed to the curing light source. For example, the heat resistant member 130 may be a plastic material that does not absorb energy from the curing light source 106. In other words, the heat resistant member 130 should not contribute to the heat applied to the thermal paper 132, which may provide false readings.

In one embodiment, after the thermal paper 132 absorbs energy from the UV light emitted from the curing light source 106, the thermal paper 132 may be moved in front of an inline failure detection (IFD) system 102. The IFD system 102 may be positioned to read the thermal paper 132 to confirm that the curing light source 106 is operating correctly. In other words, operating correctly may be defined as having the transition color of the thermal paper 132 match a transition color associated with a correct light intensity value across an entire area of the thermal paper 132.

In one embodiment, the IFD system 102 may be positioned vertically above or below the curing light source 106 and the array of printheads 104 depending on which direction printing occurs along the support member 108. Said another way, the IFD system 102 may be stacked directly above or below the curing light source 106 along the plane formed by the array of printheads 104.

As noted above, the marking material may be cured via the curing light source 106. However, insufficient curing can cause harmful volatile organic compounds (VOCs) to be emitted from the marking material. The IFD system 102 may confirm that the curing light source 106 is operating correctly to ensure that all marking material is properly cured. For example, if an LED in a portion of the curing light source 106 were to fail, or operate at a non-optimal intensity, the marking material on the corresponding portion of the object 122 would not cure completely.

The controller 124 may be operatively coupled to the IFD system 102. If the IFD system 102 confirms that the curing light source 106 is operating correctly, the printing process may proceed to completion. However, if the IFD system 102 determines that the curing light source 106 is not operating correctly, the controller 124 may end the printing process. The curing light source 106 may be fixed or corrected to address the failure that was detected. A new thermal paper 132 may be inserted into the heat resistant member 130. The controller 124 may then control the actuator 116 to move heat resistant member 130 holding the new thermal paper 132 back in front of the curing light source 106 for additional testing. A more detailed diagram and description of the IFD system 102 is provided below.

Figure 2:
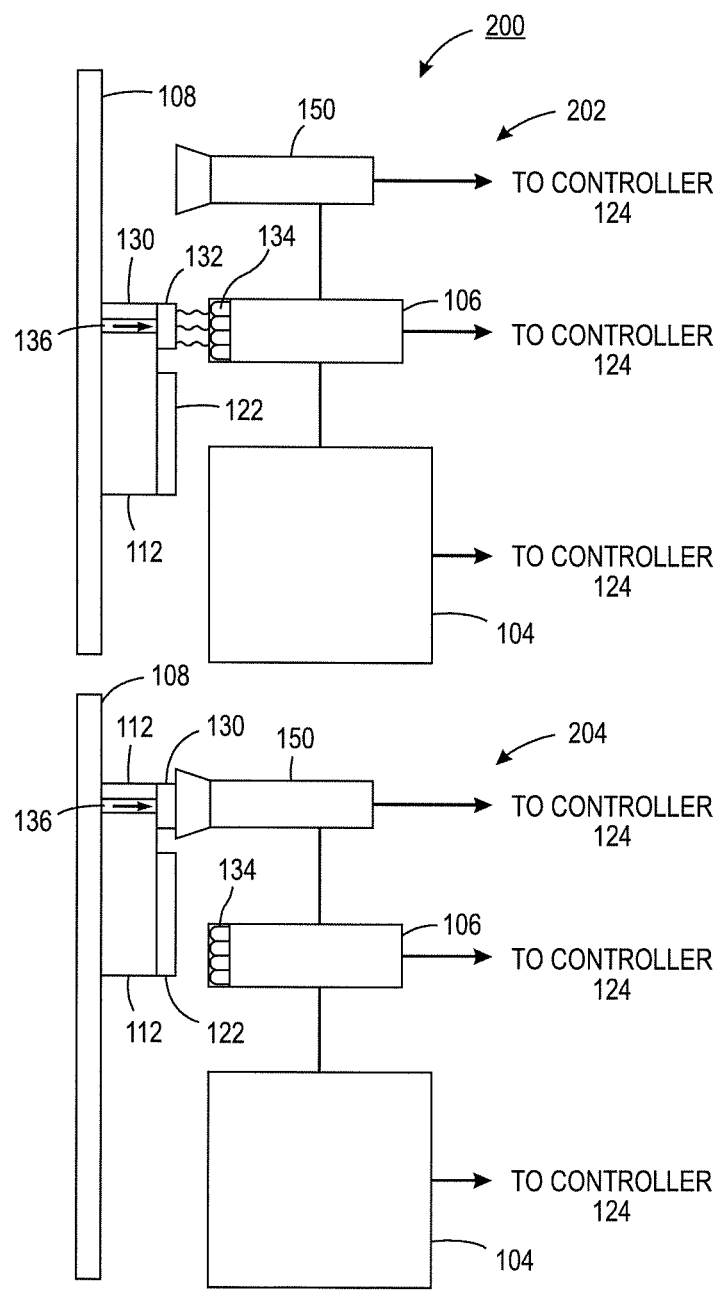
FIG. 2 illustrates an example process flow block diagram of detecting inline failure of a curing light source.

FIG. 2 illustrates an example process flow diagram of detecting inline failure of the curing light source 106. For example at block 202, during operation of the print system 100, the curing light source 106 may apply energy to the thermal paper 132. In one embodiment, one or more UV LEDs 134 may be used to emit light at a particular wavelength or light intensity to apply the energy. The UV LEDs 134 may be arranged in a two dimensional array. In one embodiment, the UV LEDs 134 may be individually addressable. In another embodiment, the UV LEDs 134 may be addressable as a row or a column of UV LEDs 134.

In one embodiment, the heat resistant member 130 may optionally include a mechanical arm or member 136 that can move the thermal paper 132. The mechanical arm 136 may move the thermal paper 132 horizontally along a direction shown by the arrow. For example, to ensure consistent measurement and readings, the mechanical arm 136 may move the thermal paper 132 towards the curing light source 106 to a predefined distance (e.g., a few millimeters, a few centimeters, and the like). Said another way, the mechanical arm 136 may ensure that a gap between the thermal paper 132 and the curing light source 106 is constant, or the same distance, each time the curing light source 106 applies energy to the thermal paper 132.

Figure 3:
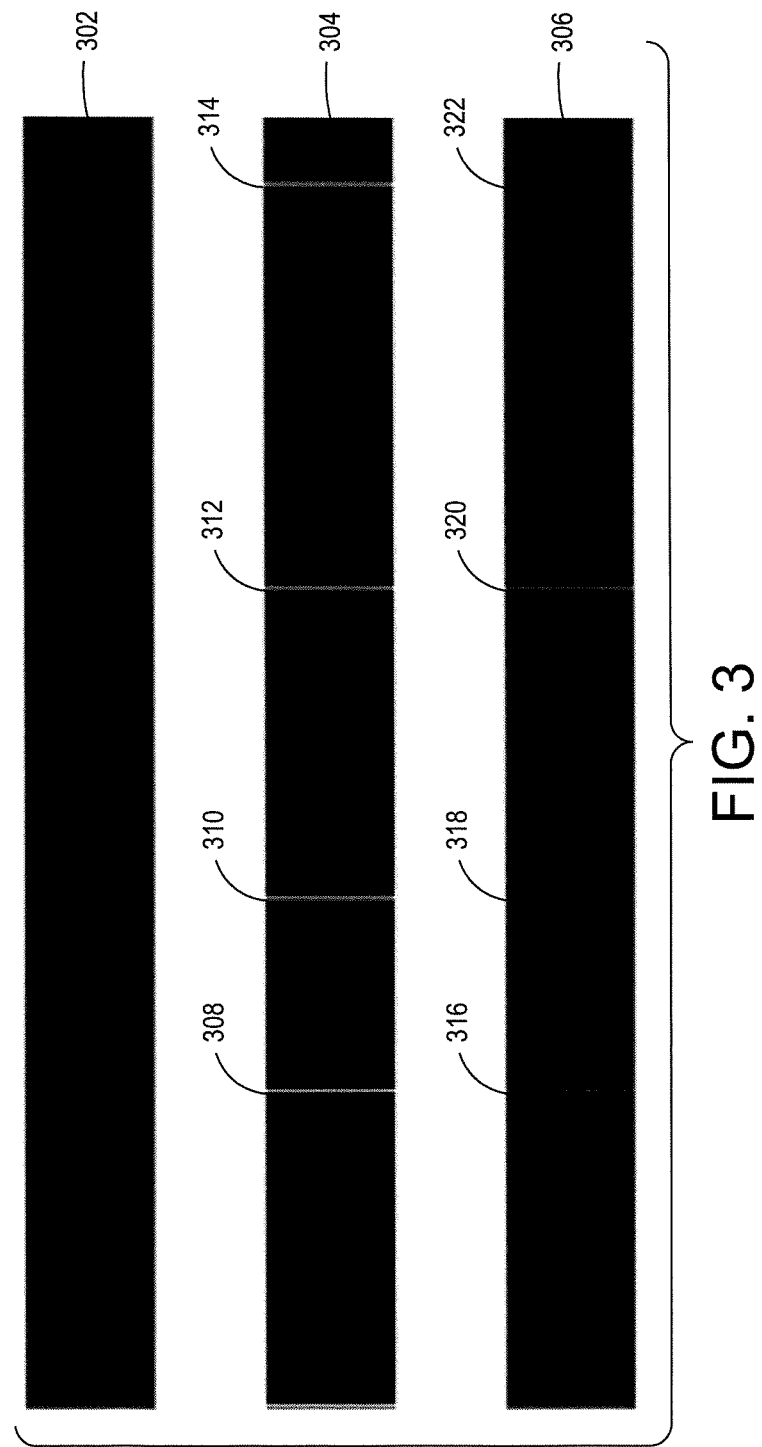
FIG. 3 illustrates various different video images of thermal paper.

At block 204, the IFD system 102 may read the thermal paper 132. For example, in one embodiment, the IFD system 102 may include a video camera 150. The video camera 150 may be a red, green, blue (RGB) camera that can capture video images or still images. The video camera 150 may capture a video image of the thermal paper 132. FIG. 3 illustrates an example of various different video images 302, 304 and 306 of the thermal paper 132.

In one embodiment, a relationship between change in temperature and light intensity emitted by the curing light source 106 may be linear given a constant distance and time of exposure. The linear relationship is illustrated in a graph 400 in FIG. 4. Moreover, the thermal paper 132 may have different transition colors based on exposure to different temperatures as illustrated in FIG. 5. For example, the transition color 502 may be associated with a delta of 90 degrees Celsius (° C.), the transition color 504 may be associated with a delta of 85° C., the transition color 506 may be associated with a delta of 80° C., the transition color 508 may be associated with a delta of 75° C., the transition color 510 may be associated with a delta of 70° C., the transition color 510 may be associated with a delta of 70° C., and so forth. It should be noted that the transition colors illustrated in FIG. 5 are examples and that different types of thermal paper may have different transition colors, different correlations of transition color to temperature, and the like.

Figure 4:
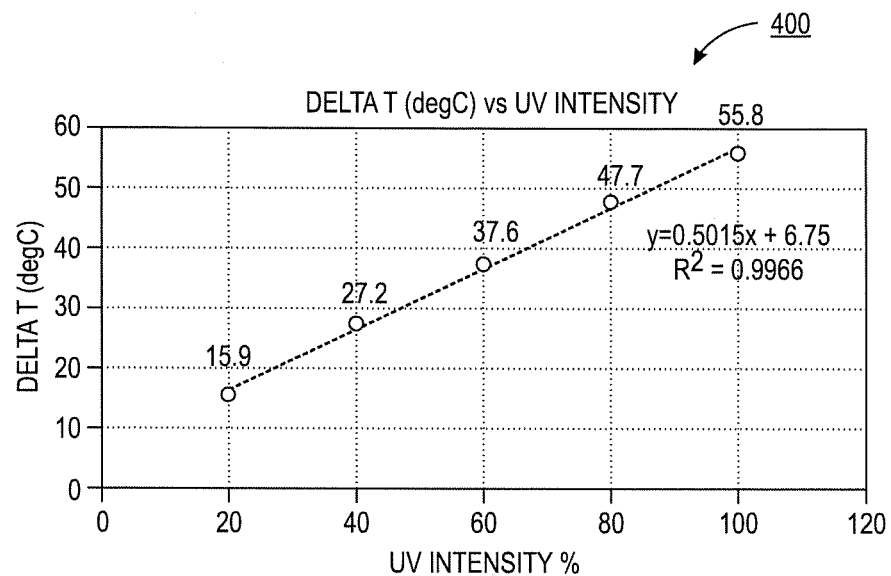
FIG. 4 illustrates an example chart of temperature versus intensity of the curing light source.
Figure 5:
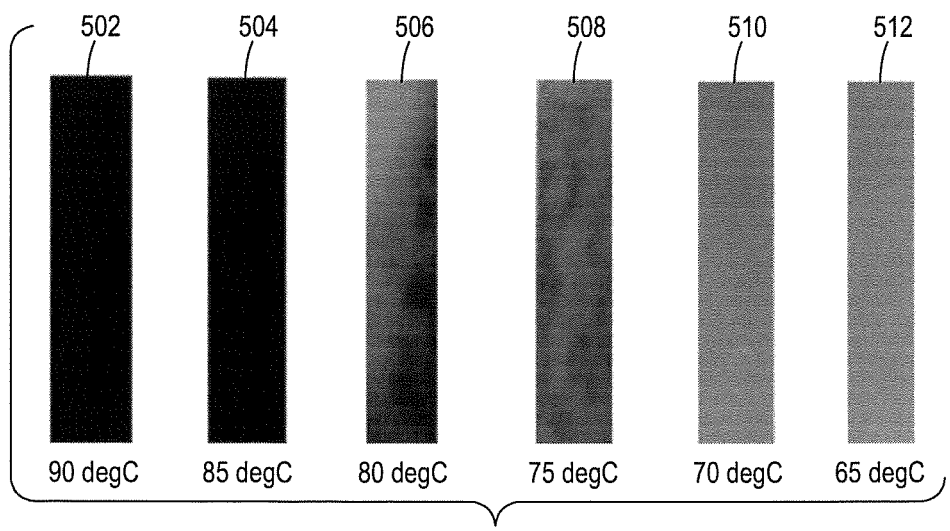
FIG. 5 illustrates an example of various transitions of thermal paper at different temperatures.

Thus, using the known relationships between transition colors to temperature change illustrated in FIG. 5 and the linear relationship between temperature change and light intensity illustrated by graph 400 in FIG. 4, the color of the thermal paper 132 may be used to determine if the curing light source 106 is operating correctly or has failed. For example, the printing system 100 may use a particular light intensity to completely cure the marking material. The IFD system 102 may store a plurality of different video images of each transition color in a memory of the IFD system 102. The video image 302 captured by the video camera 150 may be compared by the IFD system 102 to the plurality of different video images to find a match, or the closest match. The transition color of the matching video image may be correlated to a light intensity using the graph 400. The IFD system 102 may then determine if the correlated light intensity matches the required light intensity for the curing light source 106 to properly cure the marking material.

In one embodiment, the video image 302 may illustrate an example of the thermal paper 132 that has been exposed to the correct light intensity emitted by the curing light source 106. In other words, the entire area of the thermal paper 132 has a same transition color is associated with a proper light intensity.

In one embodiment, the video image 304 may include lines 308, 310, 312 and 314. The lines 308, 310, 312 and 314 may not have transitioned to any color. In other words, the UV LEDs 134 of the curing light source 106 at the location of the lines 308, 310, 312 and 314 may have failed. In other words, the LEDs may not be emitting any light and may have failed.

In one embodiment, the video image 306 may include lines 316, 318, 320 and 322. The lines 316, 318, 320 and 322 may have transitioned to a variety of different transition colors. The IFD system 102 may compare the transition color of the lines 316, 318, 320 and 322 to the plurality of different video images stored in the IFD system 102 to determine the light intensity at the location of the lines 316, 318, 320 and 322. In one embodiment, the curing light source 106 may have failed because the UV LEDs 134 located in the curing light source 106 at the corresponding location of lines 316, 318, 320 and 322 may not be operating at full efficiency. In other words, the UV LEDs 134 located in the curing light source 106 at the corresponding location of lines 316, 318, 320 and 322 may not be emitting enough light intensity to properly cure the marking material.

The relationship between the light intensity and temperature change illustrated by graph 400 in FIG. 4 may be used to determine a magnitude of the inefficiency of the UV LEDs 134. For example, if the UV LEDs 134 that correspond to the line 316 are determined to be operating at 60% of the desired light intensity based on a temperature that is associated with the transition color of the line 316. Thus, the UV LEDs 134 that correspond to the line 316 may be adjusted by increasing the light intensity by a magnitude of 40% of the desired light intensity. Determining the magnitude of inefficiency using the thermal paper 132 may help determine the amount of adjustment required for neighboring UV LEDs 134 when a correction is performed, as discussed below.

If the IFD system 102 determines that the curing light source 106 has not failed, then the printing process may proceed to completion. However, if the IFD system 102 determines that the curing light source 106 has failed, the IFD system 102 may signal the controller to stop the printing process.

In one embodiment, the failure of the curing light source 106 may be corrected. For example, the failed UV LEDs 134 may be replaced. In another example, if the UV LEDs 134 are underperforming, but still operational, the UV LEDs 134 may be adjusted. For example, the light intensity of neighboring UV LEDs 134 may be increased to compensate for the UV LEDs 134 that are underperforming.

After the failure of the curing light source 106 is corrected a new thermal paper 132 may be placed in the heat resistant member 130. The process flow 200 may then be repeated until the IFD system 102 determines that the curing light source 106 is operating correctly.

In one embodiment, the IFD system 102 may determine whether the curing light source 106 is operating correctly in-line during the printing process of the object 122. In other words, the marking material is ejected onto the object 122 and the curing light source 106 applies energy to the thermal paper 132 and then the marking material. The thermal paper 132 may then be read by the video camera 150 of the IFD system 102, as described above.

In one embodiment, the IFD system 102 may determine whether the curing light source 106 is operating correctly before the printing process begins. For example, after the object 122 is loaded into the printing system 100 the printing process is initiated, the controller 124 may not start the printing process until the IFD system 102 confirms that the curing light source 106 is operating correctly.

Referring back to FIG. 1, in one embodiment, the support member 108 is positioned to be parallel to the plane formed by the array of printheads and, as shown in FIG. 1, is oriented so one end of the support member 108 is at a higher gravitational potential than the other end of the support member 108. This orientation enables the printing system 100 to have a smaller footprint than an alternative embodiment that horizontally orients the two-dimensional array of printheads and configures the support member, the member, and the object holder to enable the object holder to pass objects past the horizontally arranged printheads so the printheads can eject marking material downwardly on the objects.

The member 112 is movably mounted to the support member 108 to enable the member to slide along the support member 108. In some embodiments, the member 112 can move bi-directionally along the support member 108. In other embodiments, the support member 108 is configured to provide a return path to the lower end of the support member 108 to form a track for the member 112. The actuator 116 is operatively connected to the member 112 so that the actuator 116 can move the member 112 along the support member 108 and enable the object holder 120 connected to the member 112 to pass the two-dimensional array of the plurality of printheads 104 in one dimension of the two-dimensional array of printheads 104.

In the embodiment, the object holder 120 moves the object 122 along a length dimension of the array of printheads 104. The object holder 120 may have different shapes and sizes depending on a shape and size of the object 122. For example, different object holders 120 may be coupled to the member 112 for different objects 122. The object holder 120 may be custom built for each different type of object 122 that is used in the printing system 100.

In one embodiment, the printing system 100 may include an optical sensor 110. The optical sensor 110 may be a scanner to scan a stock keeping unit (SKU) or barcode on the object 122. The SKU may provide information to the controller 124 with regards to how to control the array of printheads 104 to print an image onto the surface of the object 122. For example, different shaped objects 122 may have different printing profiles that may be included into the SKU.

In one embodiment, the optical sensor 110 may be a scanner that can scan the object 122 to determine a profile of the object 122. For example, the printing system 100 may determine a printing profile on-the-fly using the optical sensor 110. The surface profile scanned by the optical sensor 110 may be transmitted to the controller 124. The controller 124 may then calculate a sequence of operation of the printheads of the array of printheads 104 and an amount of marking material to eject from each printhead.

In one embodiment, the controller 124 is configured with programmed instructions stored in a memory 128 operatively connected to the controller so the controller can execute the programmed instructions to operate components in the printing system 100. Thus, the controller 124 is configured to operate the actuator 116 to move the object holder 120 past the array of printheads 104 and to operate the array of printheads 104 to eject marking material onto the object 122 held by the object holder 120 as the object holder 120 passes the array of printheads 104.

In one embodiment, the controller 124 may also be operatively coupled to an interface 160. The interface 160 may include a display 162, an annunciator 164 and an input device 168, such as a keypad. The interface 160 may be used to notify an operator if a printing program for a particular SKU is not available, display error messages, completion messages, and the like, on the display 162. The annunciator 164 may provide a warning light or an audible alarm to attract attention to messages on the display 162 or to indicate an error has occurred.

Additionally, the controller 124 is configured to operate the inkjets within the printheads of the array of printheads 104 so they eject drops with larger masses than the masses of drops ejected from such printheads. In one embodiment, the controller 124 operates the inkjets in the printheads of the array of printheads 104 with firing signal waveforms that enable the inkjets to eject drops that produce drops on surfaces of the object 122 having a diameter of about seven to about ten millimeters (mm). This drop size is appreciably larger than the drops that produced drops on the material receiving surface having a mass of about 21 nanograms (ng).

It should be noted that the orientation of the components of the printing system 100 is provided as an example. For example, FIG. 1 illustrates the printing process moved vertically upwards from the bottom of the page towards the top of the page. However, it should be noted that the components may be flipped such that the printing process may move vertically downwards from the top of the page to the bottom of the page.

The system configuration shown in FIG. 1 is especially advantageous in a number of aspects. For one, as noted above, the vertical configuration of the array of printheads 104 and the support member 108 enables the printing system 100 to have a smaller footprint than a system configured with a horizontal orientation of the array and support member. This smaller footprint of the printing system 100 enables the printing system 100 to be housed in a single cabinet and installed in non-production outlets. Once installed, various object holders can be used with the system to print a variety of goods that are generic in appearance until printed.

Another advantageous aspect of the printing system 100 shown in FIG. 1 is the gap presented between the objects 122 carried by the object holder 120 and the printheads of the array of printheads 104. The gap in this embodiment is in a range of about five to about six mm. Heretofore, the gap was maintained in a range centered about 1 mm. This smaller gap was thought to ensure a more accurate placement of drops from an ejecting printhead. It has been discovered that the greater gap width reduces the effect of laminar air flow in the gap between the printheads and the surface receiving the marking material drops so the accuracy of drop placement, especially for larger 3D objects, is maintained. This effect is particularly effective with the larger drop sizes noted previously. Without the turbulence produced by the movement of an object in close proximity to a printhead, the momentum of the ejected drops is adequate to keep the drops on their projected course so the registration of the drops from different printheads can be preserved for maintaining image quality. Additionally, the controller 124 can be configured with programmed instructions to operate the actuator 116 to move the object holder 120 at speeds that attenuate the air turbulence in the larger gap between the printhead and the surface of the object 122 used in the printing system 100.

Figure 6:
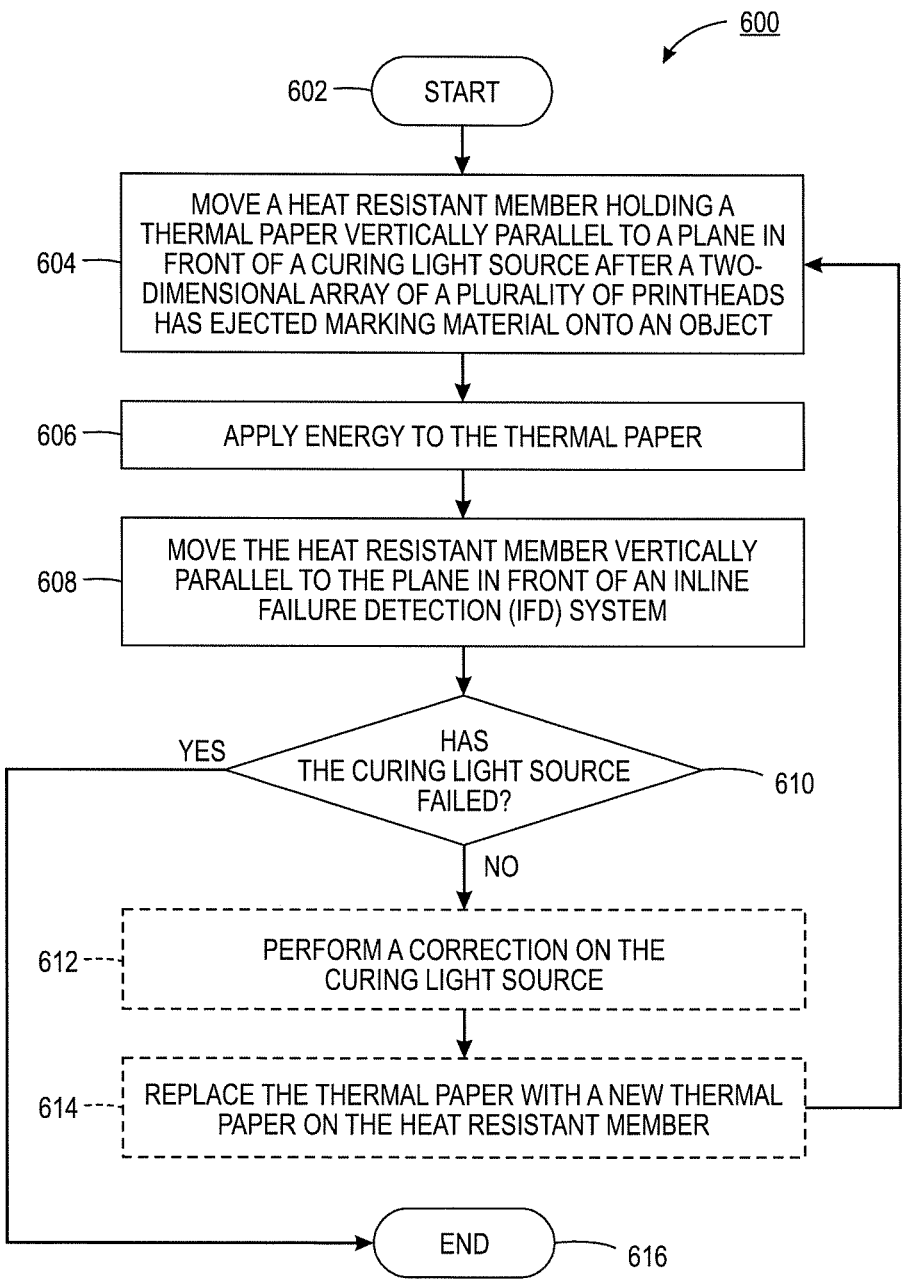
FIG. 6 illustrates a flowchart of an example method for inline failure detection of a curing light source in a 3D object printer.
Figure 7:
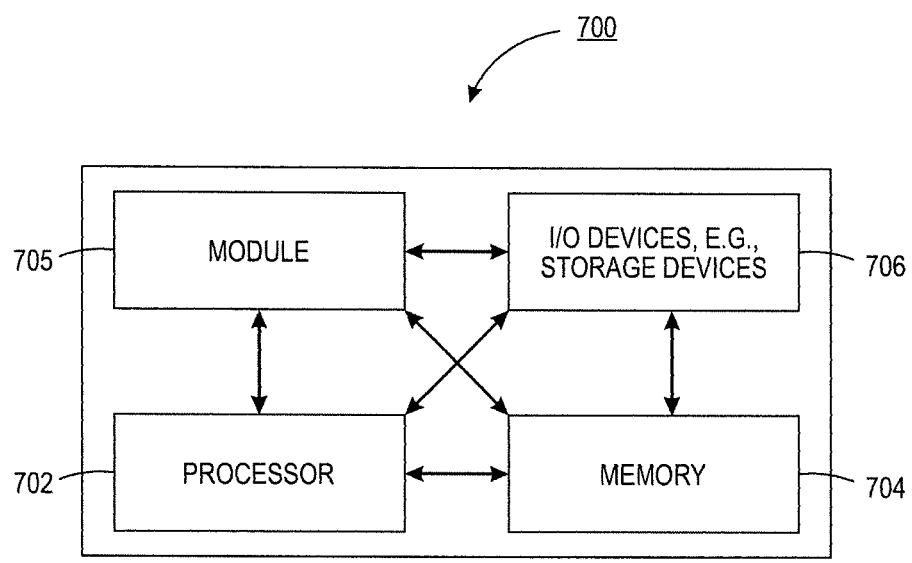
FIG. 7 illustrates a high-level block diagram of a computer suitable for use in performing the functions described herein.

FIG. 6 illustrates a flowchart of an example method 600 for inline failure detection of a curing light source in a 3D object printer. In one embodiment, one or more steps or operations of the method 600 may be performed by the printing system 100 or a computer that controls operation of the printing system 100 as illustrated in FIG. 7 and discussed below.

At block 602, the method 600 begins. At block 604, the method 600 moves a heat resistant member holding a thermal paper vertically parallel to a plane in front of a curing light source after a two-dimensional array of a plurality of printheads has ejected marking material onto an object. In one embodiment, the plane may be an imaginary surface to which each one of the plurality of printheads may be aligned. The object may move parallel to this plane vertically up and down.

In one embodiment, the heat resistant member holding the thermal paper may be moved during a printing process (e.g., the testing of the curing light source may be performed in-line). In another embodiment, the heat resistant member holding the thermal paper may be moved before a printing process begins.

In one embodiment, the thermal paper may be moved towards the curing light source to a predefined distance (e.g., a few millimeters, a few centimeters, and the like). For example, the thermal paper may be moved towards the curing light source to a desired gap distance between the curing light source and the thermal paper. For example, mechanical arms or members may hold the thermal paper that may move horizontally towards and away from the curing light source.

At block 606, the method 600 applies energy to the thermal paper. For example, the curing light source may emit light that is used to apply energy to the thermal paper. The thermal paper may be a fine paper that is coated with a chemical that may change color when exposed to heat. The chemical may be a solid-state mixture of a dye and a suitable matrix. The thermal paper may transition to different colors based upon an amount of energy or temperature that the thermal paper is exposed to.

In one embodiment, the curing light source may comprise a plurality of UV emitting LEDs. The energy from the UV emitting LEDs may be absorbed by the thermal paper causing the thermal paper to transition to a different color or colors.

In one embodiment, the curing light source may be turned on to emit energy from the UV emitting LEDs for a predefined time period. For example, the predefined time period may be an amount of time that the curing light source would be turned on to cure the marking material that is ejected onto the object during a printing process.

At block 608, the method 600 moves the heat resistant member vertically parallel to the plane in front of the an inline failure detection (IFD) system. In one embodiment, after the energy is applied to the thermal paper, the heat resistant member holding the thermal paper may be moved into a position such that a video camera of the IFD system may read the thermal paper. The video camera may capture an image of the thermal paper.

At block 610, the method 600 determines if the curing light source has failed. In one embodiment, the video image of the thermal paper captured by the video camera of the IFD system may be compared to a plurality of different video images of transition colors stored in the memory of the IFD system. Each one of the plurality of different video images of transition colors may be associated with a different temperature change. The temperature change may be associated with a particular light intensity value. As a result, the light intensity value associated with the transition color of the thermal paper may be determined based on a comparison of the video image of the thermal paper and the plurality of different video images of transition colors stored in the memory of the IFD system.

Once the light intensity value of the thermal paper is determined, the light intensity value may be compared to a desired light intensity value or threshold that the curing light source should emit to properly cure the marking material. If the light intensity value falls below the threshold, the IFD system may detect a failure of the curing light source.

In one embodiment, different areas of the thermal paper may have different transition colors. The locations on the thermal paper that have different transition colors may indicate one or more UV LEDs of the curing light source may have failed or operating inefficiently. For example, the UV LEDs may be identified by the location of the UV LEDs on the curing light source that correspond to a location of the different transition colors on the thermal paper.

If the IFD system does not detect a failure of the curing light source, then the method 600 may proceed to block 616. At block 616, the method 600 ends.

If the IFD system detects a failure of the curing light source, the method 600 may proceed to optional blocks 612 and 614. In another embodiment, the method 600 may also proceed to block 616 and end if a failure of the curing light source is detected.

At optional block 612, the method 600 performs a correction on the curing light source. In one embodiment, the correction may be replacing the UV LEDs of the curing light source. For example, if the UV LEDs of the curing light source have failed, then the UV LEDs may be replaced. In another embodiment, the correction may be to adjust one or more UV LEDs. For example, if the UV LEDs are operating inefficiently, or not emitting a desired light intensity, then the light intensity of one or more neighboring UV LEDs may be increased or decreased to compensate for the UV LEDs that are not operating at the correct light intensity.

At optional block 614, the method 600 replaces the thermal paper with a new thermal paper on the heat resistant member. In one embodiment, thermal paper may be removed and the new thermal paper may be placed, or coupled, to the heat resistant member. In another embodiment, the thermal paper may be on a continuous roll. As a result, when the printing system 100 is ready to perform another test, the continuous roll may be rotated such that an unused portion of the continuous roll of the thermal paper is exposed. The method 600 may then return to block 604 and blocks 604-610 may be repeated until the curing light source is operating correctly or the failure is resolved.

It should be noted that the blocks in FIG. 6 that recite a determining operation or involve a decision do not necessarily require that both branches of the determining operation be practiced. In other words, one of the branches of the determining operation can be deemed as an optional step. In addition, one or more steps, blocks, functions or operations of the above described method 600 may comprise optional steps, or can be combined, separated, and/or performed in a different order from that described above, without departing from the example embodiments of the present disclosure.

FIG. 7 depicts a high-level block diagram of a computer that is dedicated to perform the functions described herein. As depicted in FIG. 7, the computer 700 comprises one or more hardware processor elements 702 (e.g., a central processing unit (CPU), a microprocessor, or a multi-core processor), a memory 704, e.g., random access memory (RAM) and/or read only memory (ROM), a module 705 for inline failure detection of a curing light source in a 3D object printer, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for inline failure detection of a curing light source in a 3D object printer (e.g., a software program comprising computer-executable instructions) can be loaded into memory 704 and executed by hardware processor element 702 to implement the steps, functions or operations as discussed above in connection with the example method 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for inline failure detection of a curing light source in a 3D object printer (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for detecting inline failure of a curing light source of a 3D object printer, comprising:
   moving a heat resistant member holding a thermal paper vertically parallel to a plane in front of a curing light source after a two-dimensional array of a plurality of printheads has ejected marking material onto an object;
   applying energy to the thermal paper;
   moving the heat resistant member vertically parallel to the plane in front of an inline failure detection (IFD) system; and
   detecting failure of the curing light source based on a reading of the thermal paper.

2. The method of claim 1, wherein the detecting comprises:
   capturing an image of the thermal paper; and
   comparing the image to a plurality of different video images of transition colors.

3. The method of claim 2, wherein each one of the plurality of different video images of transition colors is associated with a different light intensity value.

4. The method of claim 3, further comprising:
   determining a light intensity value at each location across the width of the thermal paper based on the comparing the image to the plurality of different video images of transitions colors; and
   determining that the curing light source has failed when the light intensity value at any location across the width of the curing light source falls below a threshold or is zero.

5. The method of claim 4, further comprising:
   identifying one or more LEDs of the curing light source that have failed based on a location of the LEDs that correspond to a location on the thermal paper that has a light intensity value that falls below the threshold or is zero.

6. The method of claim 2, wherein the image of the thermal paper is captured by a video camera of the IFD system.

7. The method of claim 1, wherein the moving the heat resistant member in front the curing light source, further comprises:
   moving the thermal paper towards the curing light source to a predefined distance.

8. The method of claim 1, further comprising:
   correcting one or more LEDs of the curing light source in response to the failure of the curing light source that is detected.

9. The method of claim 8, wherein the correcting comprises, adjusting a light intensity of the one or more LEDs or replacing the one or more LEDs.

10. The method of claim 8, further comprising:
    replacing the thermal paper with a new thermal paper on the heat resistant member; and
    repeating the moving the heat resistant member in front of the curing light, the applying, the moving the heat resistant member in front of the IFD system and the detecting.

* * * * *